Nov. 21, 1972   J. T. CULLOM   3,703,366
PROCESS FOR PRODUCING COPPER AND ELEMENTAL SULFUR
Filed Nov. 20, 1970
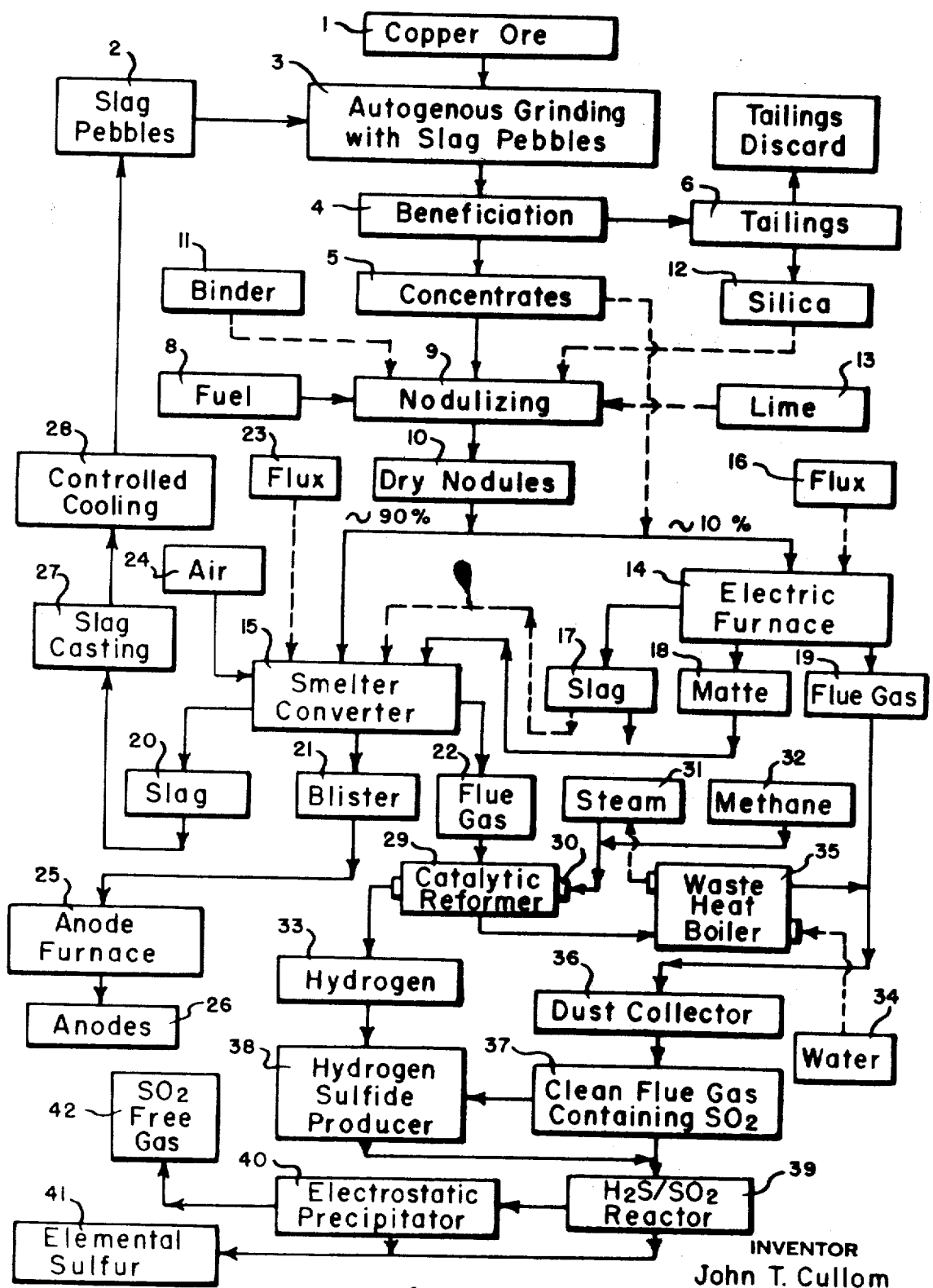
INVENTOR
John T. Cullom United States Patent Office 3,703,366
Patented Nov. 21, 1972

3,703,366
PROCESS FOR PRODUCING COPPER AND
ELEMENTAL SULFUR
John T. Cullom, 628 6th Ave., San Manuel, Ariz. 85631
Filed Nov. 20, 1970, Ser. No. 91,298
Int. Cl. C01b 17/04; C22b 13/06
U.S. Cl. 75—74
15 Claims

ABSTRACT OF THE DISCLOSURE

An integrated process is disclosed for recovering copper and elemental sulfur from sulfidic copper ore, the effluent flue gases of the process being substantially free of sulfur dioxide and other sulfurous gases. In the process the sulfidic copper ore is ground autogenously to produce a finely divided flotation feed material that is subjected to froth flotation to obtain a copper ore concentrate and siliceous flotation tailings. The copper ore concentrate is mixed and nodulized with a carbonaceous fuel and a flux to produce autogenous smelting nodules. The nodules are smelted autogenously and the resulting molten matte and slag are converted to molten blister copper and converter slag by blowing the heated nodules, matte and slag with an oxidizing gas in a converter. The blister copper is recovered as one product of the process, and the converter slag is cast in the form of grinding boulders which are utilized as the grinding medium in the autogenous grinding step of the process. The sensible heat of the hot converter gas is utilized to supply the thermal energy requirements of a catalytic reformer in which steam and methane are reacted to produce hydrogen and carbon oxides. The resulting hydrogen is reacted with the sulfur dioxide content of the converter gas to produce hydrogen sulfide gas, and this hydrogen sulfide is reacted with a further quantity of sulfur dioxide to produce elemental sulfur which is recovered as the second product of the process. The converter gas is substantially depleted in its sulfur dioxide content and may safely be discharged into the atmosphere.

BACKGROUND OF THE INVENTION

Field of the invention

This invention relates to the recovery of copper from sulfidic copper ores, and in particular to an integrated overall process for the recovery of both the copper and sulfur content of these ores and for the removal of sulfurous gases from the effluent flue gases.

Prior art

The conventional process for the recovery of metallic copper from low grade sulfidic copper ores (containing, say, 1–2% Cu) involves crushing and then grinding the copper ore in a ball mill or the like to liberate the individual mineral particles, followed by benefication of the finely ground ore to obtain a copper ore concentrate (containing, say, 20–30% Cu) and ore tailings. The ore concentrate is usually smelted in a reverberatory furnace to obtain matte (a complex mixture of metallic sulfides, principally copper and iron sulfides, commonly containing 30 to 50% Cu), reverberatory furnace slag (which usually contains less than 1% Cu) and flue gases. The molten matte withdrawn from the reverberatory furnace is transferred to a converter where it is mixed with siliceous flux materials and is blown with an oxidizing gas (for example, air) to produce converter slag, blister copper and converter flue gas. The impure blister copper is refined by pyrometallurgical and/or electrolytic techniques to obtain high purity copper, and the molten converter slag (which contains up to 4% or more Cu) is recycled to the reverberatory furnace for recovery of the copper content thereof.

The reverberatory furnace operates more or less continuously and produces flue gases of fairly uniform temperature for example, about 1800 to 2300° F.) and sulfur content (for example, about 1 to 2% $SO_2$). On the other hand, the converter operates cyclically with several successive charging, blowing and pouring phases within each cycle. The converter is blown intermittently as successive batches of matte and flux are oxidized to produce converter slag and white metal and then to produce blister copper. The intermittent blowing results in the intermittent production of converter gases. However, during the blowing phases of the converter cycle, converter gases ranging in temperature from about 1500 to 2300° F. and containing from about 3 to 13% $SO_2$ are produced and must be disposed of.

There are a number of problems associated with the aforementioned ore beneficiation, smelting and converting operations. For example, converter slag contains a relatively large quantity of copper, and the converter slag is usually recycled to the reverberatory furnace for recovery of the copper content thereof. In the absence of other considerations the converter would be operated under conditions such that the converter slag contains an appreciable amount of magnetite ($Fe_3O_4$). However, excessive quantities of magnetite have an adverse affect on the operation of the reverberatory furnace. As a result, the converter must be operated under conditions such that the converter slag contains no more magnetite than can be assimilated by the reverberatory furnace.

A further problem associated with the reverberatory furnace is the fact that the smelting of copper ore is essentially an ore melting operation in which the ore concentrate is melted to produce molten matte and slag. The smelting operation requires a large amount of fuel and produces enormous quantities of very hot flue gases containing a quantity of sulfur dioxide. It is necessary for economic reasons to recover the waste heat content and for environmental reasons to remove the sulfur dioxide content of the smelter gas. The removal of sulfur dioxide from reverberatory flue gas is complicated by the fact that the gas contains only 1 to 2% $SO_2$ which makes the cost of treatment of the gas prohibitively expensive. A related problem is the recovery of the waste heat content and the removal of the sulfur dioxide content of the converter gas, complicated in this case by the intermittent operation of the converter previously described.

The need for coordination of the operation of the converter with the requirements of the reverberatory furnace and for recovery of waste heat and sulfur dioxide from reverberatory furnace gas would be eliminated if smelting the ore in a reverberatory furnace could be eliminated. To this end it has heretofore been proposed that the ore concentrates be smelted in an electric furnace. However, this requires large quantities of low cost electricity, and in any case this does not eliminate the need for treatment of the converter slag to recover the copper content thereof or solve the difficult task of removal of sulfur dioxide from the intermittently produced converter flue gas.

After an extensive investigation of the aforementioned and related problems I have now devised a new, wholly integrated process for the recovery of copper from sulfidic copper ores in which process substantially all of the sulfur content of the flue gases are also recovered, thereby permitting the safe discharge of these gases into the atmosphere. In my new process the copper ore concentrates are formed into autogenous smelting nodules which are charged directly to a converter where the nodules are first smelted and the resulting matte is then converted to blister copper by blowing the charge with air or oxygen-enriched air. The converter slag advantageously is used to produce slag grinding boulders which are employed to grind the ore in the ore beneficiation step of the process. The flue gases from the converter are treated as hereinafter described to recover the sulfur content thereof. Because the smelting and converting operations are carried out more or less uninterruptedly in the same vessel, fluctutations in the sulfur dioxide content of the converter gases are minimized, residual fluctuations due to start-up or pouring on the like being compensated for by sulfur dioxide-rich flue gases produced by a small, intermittently operated electric furnace.

SUMMARY OF THE INVENTION

In my new process for producing copper and sulfur from sulfidic copper ore, the copper ore is first ground advantageously autogenously with grinding boulders obtained from converter slag, to reduce the ore to finely divided particles of cupriferous materials and gangue materials. The finely divided copper ore is then beneficiated, advantageously by froth flotation, to separate and recover an ore concentrate fraction comprised predominantly of the aforesaid cupriferous material and an ore tailing fraction comprised predominantly of gangue material. The copper ore concentrate is mixed with a carbonaceous fuel and flux, and the mixture is nodulized to obtain autogenous smelted nodules. The smelting nodules are smelted autogenously by simultaneously heating and blowing the nodules with an oxidizing gas, the heat requirements of the smelting operation being supplied by the heat of combustion of the fuel and sulfur content of the nodules. The resulting molten matte is then blown with an oxidizing gas to convert it to blister copper and converter slag, the blister copper being recovered as one product of the process.

The converter slag advantageously is cast into suitable molds and is slowly cooled to produce slag grinding boulders therefrom, these slag boulders being used as the grinding medium in the autogenous grinding step of the process whereby the copper content of the slag is recovered. A mixture of steam and a low molecular weight hydrocarbon, such as methane, advantageously is introduced into a catalytic reformer to convert the steam and hydrocarbon to hydrogen and carbon oxides, the thermal energy requirements of the catalytic reformation reaction being supplied by the sensible heat of the hot converter gases. The hydrogen thus produced advantageously is reacted with sulfur dioxide contained in the converter gas in the presence of a catalyst to produce hydrogen sulfide gas, and the resulting hydrogen sulfide is reacted with a further quantity of sulfur dioxide in the presence of a catalyst to produce elemental sulfur. The elemental sulfur thus produced is recovered as a second product of the process and the essentially sulfur dioxide-free converter gas is discharged to the atmosphere.

In the preferred practice of the invention the autogenous smelting nodules are smelted to obtain molten matte and the molten matte is converted to molten blister copper by first blowing said nodules and then blowing said matte with an oxidizing gas in a copper converter of essentially conventional design. In this procedure a portion of the heat required to smelt the ore content of the nodules is supplied by the heat of combustion of the fuel content of the nodules and a portion is supplied by the heat of combustion of the sulfur content of the nodules and the matte. To compensate for the unavoidable fluctuations in the production of sulfur dioxide-containing flue gas from the converter, a minor portion of the autogenous smelting nodules, or a minor portion of the copper ore concentrate itself, may be advantageously smelted non-autogenously in a separate electric furnace, the molten matte obtained in this non-autogenous smelting step being admixed with the smelting nodules being smelted autogenously in the converter and the sulfur dioxide-containing gas produced in said non-autogenous smelting step being admixed with the sulfur dioxide-containing converter gas that is reacted with hydrogen in the hydrogen sulfide production step of the process. In addition, the smelting and converting operations may be carried out in two or more converters the blowing of which are alternated to compensate for fluctuations in the production of converter flue gas.

BRIEF DESCRIPTION OF THE DRAWING

The single figure of the accompanying drawing is a schematic flow sheet of an advantageous embodiment of my new process for recovering copper and sulfur from sulfidic ores.

DESCRIPTION OF THE PREFERRED EMBODIMENT

Economic considerations dictate that substantially all of the copper content of low-grade sulfidic copper ores be recovered, and conventional processes which involve the smelting of copper ore concentrates in a reverberatory furnace and the oxidization of the resulting matte in a converter adequately accomplish this objective. Similarly, environmental considerations require that substantially all of the sulfur content of the smelter flue gases be removed therefrom before these gases are released into the atmosphere. However, the flue gases from a reverberatory furnace are too voluminous and too lean in sulfur (e.g. from 1–2% $SO_2$), and the flue gases from a converter are too intermittent and too variable in sulfur content, to make the removal of sulfur from these gases an economically practical proposition.

The process of the present invention results in the production of smelter flue gases that are sufficiently rich in sulfur dioxide and sufficiently uniform in quantity to enable the sulfur content thereof to be removed and recovered efficiently and economically as hereinafter described. The production of such flue gases is accomplished primarily by the elimination of the reverberatory furnace and by the carrying out of the smelting of the ore concentrates autogenously, advantageously in the converter itself. This, in turn, requires that the ore concentrates be prepared for autogenous smelting by nodulizing the concentrates advantageously with a carbonaceous fuel, and it further requires that the copper content of the converter slag (which heretofore has been recycled to the reverberatory furnace) be recovered advantageously by utilizing the slag as the grinding medium in the autogenous grinding of the ore pursuant to the process of the invention. Accordingly, although the present process comprises a number of successive and in a sense separate procedural steps or operations—namely, advantageously autogenously grinding the ore with converter slag boulders, beneficiating the ground ore to obtain an ore concentrate, nodulizing the ore concentrate with fuel to obtain autogenous smelting nodules, smelting these nodules autogenously to obtain matte, oxidizing the matte to obtain blister copper, followed by the treatment of the flue gases to remove sulfur dioxide therefrom as hereinafter described—the various procedural steps are, in fact, completely inter-related and together comprise a new and wholly integrated copper smelting process.

The sulfidic copper ores with which the present process is concerned usually contain from about 1 to 5% by weight Cu present in the form of such minerals as chalcocite, chalcopyrite, covelite and the like. Run-of-the-mine copper ore is normally subjected to a preliminary or primary crushing operation to reduce the ore to a preliminary or primary crushing operation to reduce the ore to a predetermined particle size, the crushed ore then being ground in a ball mill or rod mill to further reduce the ore to a size suitable for use as a flotation feed material. In the autogenous grinding of copper ore the steel balls or rods of the ball or rod mill are replaced by ore or rock boulders. The crushed ore and the relatively large ore boulders are introduced into the autogenous grinding mill where the tumbling action of the mill, and the impaction of the larger particles of ore against the smaller particles, cause the ore to be ground, the ground product of the grinding operation being a finely divided flotation feed material. In the course of the grinding operation the boulders themselves are consumed by attrition, and eventually become sufficiently finely divided to form a part of the flotation feed material.

Referring now to the accompanying schematic flow sheet, in the preferred practice of the invention the crushed ore 1 is ground autogenously with grinding boulders or pebbles 2 prepared from converter slag. As indicated in the flow sheet, the finely divided product of the autogenous grinding operation 3 is subjected to a beneficiation operation 4, usually froth flotation, to obtain ore concentrates 5 containing nearly all the copper values and ore tailings 6 comprising mainly siliceous gangue materials containing very little copper values. As noted, copper ores typically contain from 1 to 5%, and usually from about 1 to 2%, by weight Cu, and converter slag typically contains from 1 to 5%, and usually from about 3 to 4%, by weight Cu. Copper ore concentrates produced by the autogenous grinding step of the process typically contain from 20 to 40% by weight Cu, and the ore tailings typically contain from 0.05 to 0.5% by weight Cu, depending on the grade of the ore and the efficiency of the beneficiation operation. Table I sets forth typical results that may be expected when representative copper ores are ground autogenously with slag boulders in accordance with my process and then are beneficiated by froth flotation.

TABLE I

| Flotation | Ore A | | Ore B | | Ore C | |
|---|---|---|---|---|---|---|
| | Parts by wt. | Assay, percent Cu | Parts by wt. | Assay, percent Cu | Parts by wt. | Assay, percent Cu |
| Heads | 100 | 2.0 | 100 | 5.5 | 100 | 0.96 |
| Concentrate | 6.6 | 29.0 | 19.1 | 27.8 | 2.7 | 31.5 |
| Tailings | 93.4 | 0.107 | 80.9 | 0.256 | 97.3 | 0.105 |

The ore concentrate 5 contains copper and iron sulfides, and the oxidation of the iron and sulfur content thereof results in the evolution of considerable heat. If the iron and sulfur content of the ore concentrate is unusually high, autogenous smelting of the concentrate can take place without the addition of extraneous fuel to the concentrate. For example, if the ore concentrate contains approximately 20% copper, 35% iron and 35% sulfur, augmentation of the ore with fuel would normally not be necessary for autogenous smelting to occur. However, the ore concentrate normally contains smaller amounts of iron and sulfur so that the heat evolved is insufficient to smelt the ore. Therefore, in order to achieve autogenous smelting of the ore concentrate I have found it necessary to augment the fuel value of the sulfur and iron content of the ore by the addition of a carbonaceous fuel thereto. The heat required to smelt the ore (expressed in B.t.u.'s per ton) is generally known or can be determined, and the fuel value of the ore concentrate (expressed in B.t.u.'s per ton) is also known or can readily be determined. Sufficient extraneous carbonaceous fuel (the fuel value of which is known) is added to the ore concentrate to supply the additional heat required to completely smelt the ore when the ore and fuel are oxidized.

In the usual case the amount of fuel required to be added to the ore concentrates will range from about 2% to 5% by weight of the concentrate (based on coal of approximately 14,000 B.t.u. rating). By way of example, a typical copper ore concentrate containing about 30.6% Cu, 3.5% $SiO_2$, 28.8% Fe, and 34.5% S will require the addition of about 70 lbs. of coal of approximately 14,000 B.t.u. rating to each ton of concentrate to achieve autogenous smelting. An equivalent amount of other carbonaceous fuels may be substituted for coal. Thus, about 7 gallons of No. 6 fuel oil per ton of concentrate (of the above-mentioned assay) will achieve the desired autogenous smelting. Carbonaceous fuels which may be employed in the practice of my process include all grades of fuel oil or other petroleum fractions, coke breeze, petroleum coke, black liquor, carbonaceous wood by-products, molasses, and coal in finely divided form. Of these I presently prefer to use No. 6 grade fuel oil and coal.

The ore concentrates 5 and fuel 8 are mixed together and then are subjected to a nodulizing operation 9 to produce autogenous smelting nodules 10. The nodulizing operation may be carried out by a rotating pan or drum nodulizer, by a briquetting machine, by compacting rolls or the like. The nodules 10 should be sufficiently strong to withstand normal handling and storage without physical degradation, and to this end it may be desirable to include a binder 11 (e.g. water or black liquor or molasses or the like) in the mixture. Advantageously, the nodules are also self-fluxing. That is, they advantageously contain sufficient siliceous materials to form a slag of the desired composition when the nodules are smelted. To augment the silica normally present in the ore concentrates 5 finely divided silica 12 derived from the flotation tailings 6 may be added to the mixture to be nodulized. In the event the ore concentrates require a basic flux addition, lime or ground limestone 13 may be added to the nodulizing mixture. The amount of flux added to the nodulizing mixture will depend, of course, on the assay of the ore concentrate 5 and the siliceous tailings 6 (or other source of flux) utilized. Usually, the added flux will comprise 5 to 25% by weight of the nodulizing mixture, and typically about 10 to 20% thereof. The nodulized mixture of ore concentrates, fuel, flux and binder is then dried to obtain strong, dust-free autogenous smelting nodules 10.

A portion of the nodules 10 (advantageously about 10%) may be smelted non-autogenously in an electric furnace 14, the balance of the nodules (about 90%) being smelted autogenously in a combined autogenous smelter and copper converter 15. Alternatively, a portion of the non-nodulized ore concentrates 5 may be smelted in the electric furnace 14 with the addition of a suitable amount of flux 16 thereto, the balance of the ore concentrate 5 being nodulized as previously described, all of the resulting nodules 10 being smelted autogenously in the smelter-converter 15. In either case, the electric furnace 14 is a two or three phase arc or resistance furnace advantageously of the continuous smelting Westly type which produces a siliceous slag 17 typically containing about 0.1% to 0.4% Cu, molten matte 18 typically containing about 30% to 50% Cu and flue gases 19 typically containing about 10% to 20% $SO_2$. The matte 18 is introduced into the converter 15 to provide a body of molten material in the converter for start-up purposes and for recovery of the copper content thereof. If desired, the slag 17, or a portion thereof, may also be introduced into the converter 15 to provide silica for fluxing purposes and to increase the volume of the molten material therein when the converter is first started up. Slag 17 not used for this purpose is discarded. The $SO_2$-rich flue gas 19 from the electric furnace 14 is treated as hereinafter described for recovery of the sulfur content thereof.

The combined smelter and converter 15 is an air blown furnace or vessel advantageously of the Pierce-Smith type (hereinafter referred to as the converter 15). Autogenous smelting nodules 10 not smelted in the electric furnace 14 are smelted autogenously and then are converted and finished in the converter 15 to produce converting slag 20 typically containing 1% to 5% Cu, blister, copper 21 typically comprising 98 to 99% Cu, and flue gases 22 typically containing about 5% to 15% $SO_2$. As noted, the converter 15 initially contains a start-up charge of molten slag 17 and matte 18 from the electric furnace 14, or it may initially contain a start-up charge of partially oxidized matte from another converter as hereinafter described. The start-up charge also may contain a siliceous flux 23 which augments the silica content of the electric furnace slag 17. This initial charge may be blown with air 24 to converter slag and white metal before the addition of the nodules 10 thereto, or the first batch of nodules may be added before the charge is blown. In any case, the nodules 10 are introduced into the converter 15 at intervals in batches of several tons each, the solid nodules quickly being smelted to molten slag and matte and then converted to white metal when the material in the converter is blown with the air 24 in the usual manner. If the nodules 10 are self-fluxing, no additional flux need be added to the converter with these nodules. If they are not self-fluxing, extraneous siliceous flux 23 must be added with each batch of nodules. When each batch of nodules 10 has been smelted and converted, the accumulated converter slag is advantageously skimmed or poured from the converter, and then an additional batch of nodules is added to the molten material in the converter for smelting. When sufficient tonnage of matte has been produced and has been blown to white metal, the white metal is blown to blister copper in a final or finish blow. The blister copper is then poured from the converter, and a fresh quantity of molten slag and matte from the electric furnace 14 is introduced into the now empty converter 15 to inaugurate a new smelting, converting and finishing cycle. The blister copper 21 is delivered to an anode furnace 25 where it is further refined by conventional procedures to produce anode copper 26.

The unavoidable intermittent blowing of the converter 15 results in undesirable fluctuations in the quantity of sulfur dioxide-containing flue gas produced by the converter. The provision of two or more converters in parallel, one of which is always being blown when another is being charged or poured, materially reduces the undesirable fluctuation in the amount of the combined flue gases being produced and contributes to the uniformity of these flue gases. Moreover, after the smelter is in operation and a quantity of partially oxidized matte has accumulated in one or more converters, a portion can be transferred to an empty converter to serve as starter matte instead of operating the electric furnace or to augment its output of matte. A more suitable operating schedule for the converters can be maintained by proportioning quantities of partly oxidized matte among several converters to insure a desired blowing rate for the converter department or to adjust the sulfur dioxide content of the combined flue gases for the department.

By way of example, Table II sets forth a representative autogenous smelting and converting cycle for a single converter in accordance with the present invention.

TABLE II

Autogenous smelting nodules

Concentrate assay: 30% Cu; 29% Fe; 35% S
Fuel (coal): 70 lbs. per ton of concentrate
Siliceous flux: 420 lbs. per ton of concentrate 1st slag blow Charge: 70 tons matte initially; 17.5 tons matte subsequently; 9 tons flux and slag
Slag: 3 ladles skimmed
Blowing time: 90 minutes
Blowing rate: 22,500 s.c.f.m. (approx.)

2nd slag blow

Charge: 40 tons nodules at 1 ton/minute; 6 tons aisle cleanup (cold dope)
Slag: 3 ladles skimmed
Blowing time: 70 minutes 3rd, 4th and 5th slag blows Charge: 40 tons nodules
Slag: 2 ladles skimmed
Blowing time: 60 minutes 6th and 7th slag blows Charge: 20 tons nodules
Slag: 1 ladle skimmed
Blowing time: 40 minutes Finish blow Charge: 9 tons flue dust
Blowing time: 180 minutes Products Blister copper: 90 tons
Slag: 145 tons
Flue gas: 13,500,000 s.c.f. (approx.)

In conventional smelter practice converter slag is recycled to the reverberatory furnace to recover the copper content thereof. However, in accordance with the preferred practice of my invention the converter slag 20 is used to produce slag boulders or pebbles 2 which are employed as the grinding media in the autogenous grinding step 3 of the process. Because, the converter slag 20 is not recycled to a reverberatory furnace, the converter 15 can be fluxed in a way that results in the most efficient and economical operation of the converter. That is to say, the converter 15 is advantageously fluxed with sufficient silica to serve the requirements of the converter while maintaining the magnetite content of the slag higher than would be possible in a conventional smelting circuit where the slag must be disposed of through the reverberatory furnace. The higher magnetite content of the slag protects the refractory lining of the converter and insures the formation of very dense and strong slag boulders for use in the autogenous grinding operation 3. The irony slag 20 is cast into pigs or sheets or other shapes that are then cooled slowly in a controlled cooling step 28 to produce hard, tough grinding boulders 2 for use in the grinding operation 3.

When converter slag is cooled quickly, for example, by quenching the slag in water, the resulting slag granules are easily ground to a particle size suitable for use as flotation feed material. However, the copper content of the quickly cooled slag is in a form (e.g., solid solutions of copper and copper compounds in a siliceous matrix) that is not amenable to recovery by flotation. When the converter slag is allowed to cool slowly and naturally form its casting temperature to the ambient temperature (that is, without artificial cooling other than the unavoidable chilling of the surface layer of the slag by the mold in which it is cast), the copper content of the slag reverts to a form (e.g., copper and copper sulfide crystals) that is amenable to recovery by flotation when the slag is ground to a particle size suitable for use as flotation feed. The slow cooling of the slag also results in a dense, tough slag casting that is difficult to reduce by conventional grinding methods but which, by the same token, makes an excellent grinding media for use in the autogenous grinding of copper ore. The term "controlled cooling" as employed herein simply means that the cast slag is not quenched but is allowed to cool slowly and naturally to the ambient temperatures.

In a typical slag casting operation 27 the converter slag 20 is cast into pigs or thick sheets in sand or earthen molds formed in the floor of the converter aisle, the cast slag then being allowed to cool slowly and naturally to about ambient temperature before being broken up into slag boulders or pebbles 2 suitable for use in the autogenous grinding operation 3. Alternatively, the slag 20 can be cast into a plurality of molds of the desired shape and size for a grinding boulder, each mold being provided with removable, water-cooled side walls that are removed from about the cast boulder as soon as a skull or skin of solidified slag has been formed about the surface of the boulder. The boulder having a still molten core is then allowed to cool slowly and naturally in accordance with the practice of my invention.

In a modification of the process of the invention, instead of employing the converter slag 20 as the grinding medium in the autogenous grinding operation 3, the slag is treated in a small slag treatment furnace to recover the copper content thereof. In this embodiment the molten slag 20 is introduced into the slag treatment furnace along with a quantity of matte or matte-forming materials such as a mixture of copper and iron sulfides, sulfidic copper ore concentrates, and the like. The copper and iron sulfides melt, or are smelted, to form a body of molten matte below the body of molten slag in the furnace. The copper contained in the slag combines with or dissolves preferentially in the molten matte, thereby reducing the copper content of the slag from about 4% to less than 1% by weight. The matte is recycled to the converter 15 for conversion to blister copper, and the slag depleted in copper is discarded.

The electric furnace 14 and the converter 15 both produce flue gases containing sulfur dioxide which must be removed therefrom before these gases can be discharged into the atmosphere. A number of procedures for removing sulfur dioxide from metallurgical flue gases have heretofore been proposed. For example, the sulfur dioxide content of such gases is commonly employed to manufacture sulfuric acid in a contact acid plant. Generally, all of these procedures require flue gases of fairly high (e.g., about 10% $SO_2$) and fairly uniform sulfur dioxide content in order to be efficient and economical.

The flue gas 19 from the furnace 14 contains from about 10 to 20% $SO_2$, but the volume of this gas is not relatively very large. The flue gas 22 from the converter 15 contains from about 5 to 15% $SO_2$ and is relatively voluminous, but the production of this gas (from a single converter) is not uniform because of the cyclic operation of the converter. Neither the furnace flue gas 19 nor the converter flue gas 22 would, by themselves, comprise a very satisfactory starting material for existing flue gas desulfurization procedures. However, when the flue gases 19 and 22 are combined as hereinafter described the resulting gas is sufficiently uniform (within procedurally acceptable limits) in volume and sulfur dioxide content to be eminently suitable for use in such procedures. Moreover, the use of two or more converters in parallel, one of which is always being blown when another is being charged or poured, further contributes to the uniformity of the combined flue gases.

The hot flue gas 22 contains a large quantity of sensible heat, as well as an unacceptably high proportion of sulfurous gases, and this sensible heat is used to supply the thermal energy requirements of a unique procedure for removing sulfur dioxide from the smelter flue gases 19 and 22 in the form of elemental sulfur. That is to say, in the process of the invention the hot, sulfur dioxide-containing flue gases are directed through a series of heat exchangers (e.g., a waste heat boiler) and catalytic reactors in order, first, to manufacture hydrogen by the catalytic reformation of steam and a hydrocarbon gas and, then, to reduce the sulfur dioxide content of the flue gas to elemental sulfur by reaction with the aforesaid hydrogen and with hydrogen sulfide. The thermal energy required for the catalytic reformation reaction and the subsequent sulfur dioxide reduction reactions is supplied wholly or for the most part by the sensible heat of the flue gases, each successive heat exchange operation or catalytic reaction being carried out at a lower temperature than its predecessor until most of the available thermal energy (i.e., sensible heat) of the flue gas has been utilized in the process.

The chemistry and operating parameters of the catalytic steam-hydrocarbon reformation reaction are well known. In this process hydrocarbons, such as methane and up to and including heptane and octane, are reacted with steam over a suitable catalyst (usually a nickel oxide catalyst) at 1,500 to 2,000° F. to produce a catalytic reformer gas comprising principally hydrogen but also containing substantial amounts of carbon dioxide and carbon monoxide in accordance with the following representative reaction:

(1) 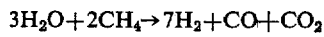   $3H_2O+2CH_4 \rightarrow 7H_2+CO+CO_2$

In the process of the invention hot converter gas 22 at a temperature of about 1,500 to 2,200° F. is brought into heat exchange relationship with the tubes of a catalytic reformer 29, the tubes 30 containing the nickel catalyst for the reformation reaction. A reaction mixture of steam 31 and hot hydrocarbon gas 32 is caused to flow through the tubes 30 to produce hot hydrogen gas 33. The hot flue gas somewhat reduced in temperature (for example, at about 1,100 to 1,800° F.) is advantageously then brought into heat exchange relationship with water 34 in a waste heat boiler 35 to generate the steam 31 and, although not so indicated in the accompanying flow sheet, to preheat the hydrocarbon gas 32 employed as feed stock for the reformation reaction. In this connection it should be noted that the efficiency of the nickel catalyst is adversely affected by the presence of unsaturated hydrocarbons and of sulfur in the hydrocarbon feed gas. Accordingly, the hydrocarbon feed gas advantageously comprises a saturated aliphatic compound containing from 1 to 8 carbon atoms and less than 10 p.p.m. of sulfur.

After the converter gas 22 has been used to supply the thermal energy requirements of the catalytic reformation reaction, the converter gas is mixed with the furnace gas 19. The combined flue gases are then treated in a dust collector 36, advantageously an electrostatic precipitator, to remove dust particles therefrom. The clean flue gas 37 is then treated as hereinafter described to remove sulfur dioxide therefrom.

The hydrogen 33 contained in the reformer gas is employed to effect reduction of a portion of the sulfur dioxide content of the dust-free flue gas 37 in accordance with the reaction:

(2) 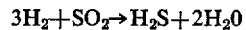   $3H_2+SO_2 \rightarrow H_2S+2H_2O$

In the preferred practice of the invention the hot hydrogen-containing gas 33 is mixed with about two-thirds of the hot sulfur dioxide-containing flue gas 37 to form a reaction mixture that is passed over a suitable catalyst in a hydrogen sulfide producer 38 that promotes the foregoing reaction. A number of catalysts for this reaction are known each of which is most effective in a specific temperature range. For example, the reduction reaction is efficiently promoted by a cobalt molybdate type catalyst at a reaction temperature of about 700° F. and by an iron sulfide catalyst at a temperature of about 600° F. The flue gas should contain substantially no free oxygen which will react with the catalyst. However, the reformer gas contains carbon monoxide which will react preferentially with any oxygen present in the flue gas, thus avoiding degrading of the catalyst.

The hydrogen sulfide content of the flue gas from the hydrogen sulfide producer 38 is reacted with the sulfur dioxide contained in the balance of the clean flue gas 37 in a $H_2S/SO_2$ reactor 39 in the presence of a suitable catalyst to produce elemental sulfur in accordance with the following reaction:

(3) 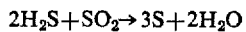   $2H_2S+SO_2 \rightarrow 3S+2H_2O$

The hydrogen sulfide-sulfur dioxide reaction is promoted by a number of catalysts known to those skilled in the art. For example, the reaction will proceed to substantial completion in the presence of an activated alumina catalyst at a reaction temperature of about 400° F. The thermal energy required to promote this reaction is largely, if not completely, supplied by the sensible heat of the smelter flue gas. The elemental sulfur product collects in the well of the catalytic reactor 39 in a form of a molten body of sulfur which is withdrawn from time to time from the reaction chamber. Residual droplets of molten sulfur entrained in the flue gas stream are removed therefrom by passing the flue gas through an electrostatic precipitator 40, the sulfur recovered from the reactor 39 and the precipitator 40 comprising the elemental sulfur product 41 of the process. The flue gas 42 now at a temperature of below 400° F. and substantially free of sulfur dioxide may now be safely discharged to the atmosphere.

The following example is illustrative, but not limitative, of the integrated process of the invention.

In the present example of the practice of the invention 525 tons per hour of crushed copper ore containing 2% by wt. Cu, 2.8% by wt. Fe, 3.9% by wt. S and 71.0% by wt. $SiO_2$ are autogenously ground with 20 tons per hour of converter slag pebbles containing 4% by weight Cu to produce 545 tons per hour of finely divided flotation feed material containing 2.0% by wt. Cu. The finely divided floation feed material is subjected to froth flotation to obtain 36 tons per hour of an ore concentrate containing 30% by wt. Cu, 29% by wt. Fe, 34% by we. S and 3.5% $SiO_2$, and 508 tons per hour of ore tailings containing 0.1% by wt. Cu.

The ore concentrate is mixed with 70 lbs. of finely divided coal (of approximately 14,000 B.t.u. rating) and 166 lbs. of finely divided siliceous flux per ton of concentrate, and the resulting mixture is nodulized in a rotating pan nodulizer to produce 40.3 tons of self-fluxing autogenous smelting nodules per hour.

4.0 tons per hour of the autogenous smelting nodules are smelted non-autogenously in an electric furnace of the Westly type to produce 3.1 tons per hour of matte containing 35.0% by wt. Cu, 0.4 ton per hour of furnace slag containing 0.35% by wt. Cu and 169,000 standard cubic feet per hour (s.c.f.h.) of furnace gas containing 15% $SO_2$. Power consumption is 657 k.w.h. per ton of ore concentrates smelted, and the average bath temperature is 2200° F.

The matte and furnace slag from the electric furnace are introduced intermittently (i.e., at the beginning of each converter cycle) into a combined converter and smelter of the Pierce-Smith type at an overall average rate of 3 tons of matte and 0.4 ton of slag per hour. Autogenous smelting nodules are introduced into the smelter-converter intermittently throughout the smelting cycle but at an overall average rate of 36 tons per hour, and the material in the smelter-converter is blown with air intermittently throughout the smelting cycle but at an overall average rate of 1,827,000 s.c.f.h. to produce 10 tons of blister copper per hour containing 98% Cu, 20 tons of converter slag per hour containing 4% by wt. of Cu and 2,400,000 s.c.f.h. of converter gas containing an average of 15% $SO_2$.

The converter slag is cast intermittently in the form of thick slabs or sheets which are allowed to cool slowly to ambient temperature before being broken up into lumps suitable for use as grinding boulders and pebbles in the autogenous grinding step of the process.

The converter flue gas at an average temperature of about 2000° F. is brought into heat exchange relationship with the tubes of a catalytic reformer containing a nickel catalyst. A mixture of 20,600 lbs. per hour of steam and 170,000 s.c.f.h. of methane are passed through the tubes of the catalytic reformer to produce 510,000 s.c.f.h. of hydrogen. The flue gas from the catalytic reformer is then brought into heat exchange relationship with a waste heat boiler which generates 10,420 lbs. of steam per hour.

The converter flue gas now at a temperature of about 500° F. is mixed with the flue gas from the electric furnace and the resulting mixture of sulfur dioxide-containing gas is passed through an electrostatic precipitator to remove dust particles therefrom.

1,600,000 s.c.f.h. of the clean sulfur dioxide-containing flue gas is mixed with 525,000 s.c.f.h. of hot hydrogen gas from the catalytic reformer, and the mixture is passed through the iron sulfide catalyst-containing tubes of a catalytic hydrogen sulfide producer to produce 170,000 s.c.f.h. of hydrogen sulfide gas.

The hydrogen sulfide-containing gas from the hydrogen sulfide producer is mixed with the balance (i.e., 84,000 s.c.f.h.) of the clean sulfur dioxide-containing flue gas, and the resulting mixture is passed through the activated alumina-containing tubes of a catalytic $H_2S/SO_2$ reactor which results in the production of 11.3 tons per hour of elemental sulfur.

The sulfur dioxide-free flue gas is passed through a second electrostatic precipitator to remove residual droplets of sulfur therefrom and the sulfur-free gas is discharged into the atmosphere. Elemental sulfur from the $H_2S/SO_2$ reactor and from the second electrostatic precipitator is recovered for subsequent use.

From the foregoing description of my new process it will be seen that I have made an important contribution to the art of which my invention relates.

I claim:

1. Method for producing metallic copper and recovering sulfur from sulfidic copper ore which comprises:
    (a) grinding the sulfidic copper ore to produce finely divided particles of cupriferous materials and gangue materials;
    (b) beneficiating said finely divided copper ore to separate and recover an ore concentrate fraction comprised predominantly of said cupriferous materials and an ore tailings fraction comprised predominantly of gangue materials;
    (c) mixing said copper ore concentrate with a carbonaceous fuel and nodulizing said mixture to obtain autogenous smelting nodules;
    (d) smelting said smelting nodules autogenously to obtain molten matte and slag while blowing said molten matte and slag with an oxidizing gas to convert it to molten blister copper and converter slag and to produce hot sulfur dioxide-containing converter gas;
    (e) recovering said blister copper as one product of the process; and
    (f) treating the converter slag to recover substantially all of the copper content thereof and treating the sulfur dioxide-containing converter gas to recover substantially all of the sulfur content thereof.

2. The method according to claim 1 in which the combined fuel value of the sulfidic material and the carbonaceous material in the smelting nodules exceeds the minimum required to smelt said nodules autogenously.

3. The method according to claim 1 in which the silica content of the smelting nodules is sufficient to make the nodules self-fluxing when said nodules are smelted and converted autogenously.

4. The method according to claim 1 in which the silica content of the ore concentrates is augmented with sufficient silica-containing ore tailings to make the nodules self-fluxing when said nodules are smelted and converted autogenously.

5. The method according to claim 1 in which the autogenous smelting nodules are smelted to obtain molten matte and slag while said molten matte and slag are converted to molten blister copper and converter slag by blowing said autogenous smelting nodules and blowing said molten matte and slag with an oxidizing gas in a converter, a portion of the heat required to smelt the ore content of the nodules of being supplied by the heat of combustion of the fuel content of said nodules and a portion being supplied by the heat of combustion of the sulfur content of the sulfidic copper ore and matte.

6. The method according to claim 5 in which the autogenous smelting nodules are smelted while the resulting molten matte and slag are converted to blister copper and converter slag in at least two converters arranged in parallel, the charge in one of said converters always being blown with said oxidizing gas when another converter is being charged or poured.

7. The method according to claim 6 in which partially oxidized matte from one converter is introduced into a second converter to provide a molten body of oxidizable material in said second converter at the start of a new smelting and converting cycle being initiated in said second converter.

8. The method according to claim 1 in which the finely divided copper ore is beneficiated by froth flotation to obtain a copper ore concentrate and flotation tailings.

9. Method for producing metallic copper and elemental sulfur from sulfidic copper ore according to claim 1 in which treating the sulfur dioxide-containing converter gas to recover substantially all of the sulfur content thereof comprises:
   (a) introducing a mixture of steam and a low molecular weight hydrocarbon into a catalytic reformer to convert said steam and hydrocarbon to hydrogen and carbon oxides, and supplying the thermal energy requirements of the catalytic reformation reaction by utilizing the sensible heat of the hot converter gas;
   (b) reacting said hydrogen with sulfur dioxide contained in the converter gas in the presence of a catalyst to produce hydrogen sulfide gas;
   (c) reacting said hydrogen sulfide gas with a further quantity of sulfur dioxide in the presence of a catalyst to produce elemental sulfur; and
   (d) recovering said elemental sulfur as the second product of the process.

10. The method according to claim 9 in which a minor portion of the copper ore concentrate is smelted non-autogenously in a separate furnace, in which the molten matte and slag obtained in said non-autogenous smelting step or admixed with the autogenous smelting nodules being smelted autogenously, and in which the sulfur dioxide-containing gas produced in said non-autogenous smelting step is admixed with the sulfur dioxide-containing converter gas that is reacted with hydrogen in the hydrogen sulfide production step of the process.

11. The method according to claim 9 in which a minor portion of the autogenous smelting nodules are smelted non-autogenously in a separate furnace in which the heat required to smelt the ore content of the nodules is supplied by a heat source other than the fuel content of the nodules, in which the molten matte and slag obtained in said non-autogenous smelting step is admixed with the portion of the autogenous smelting nodules being smelted autogenously, and in which the sulfur dioxide-containing gas produced in said non-autogenous smelting step is admixed with the sulfur dioxide-containing converter gas that is reacted with hydrogen in the hydrogen sulfide production step of the process.

12. The method according to claim 11 in which the separate furnace is an electric furnace.

13. The method according to claim 1 in which the molten converter slag is cast and slowly cooled to produce slag boulders, and in which the slag boulders are utilized as the grinding medium in the autogenous grinding of the sulfidic copper ore.

14. The method according to claim 1 in which the molten converter slag is introduced into a slag treatment furnace along with matte-forming copper sulfide—and iron sulfide-containing materials, in which a body of molten matte is produced in said furnace, in which a major portion of the copper content of the slag dissolves preferentially in said body of molten matte, and in which the molten matte is recycled to the matte conversion step of the process.

15. The method according to claim 1 in which said autogenous smelting nodules are smelted by blowing the heated nodules with an oxidizing gas, a major portion of the heat required to smelt the ore content of the nodules being supplied by the heat of combustion of the fuel content of said nodules.

References Cited
UNITED STATES PATENTS

| | | | |
|---|---|---|---|
| 568,700 | 9/1896 | Roberts | 75—72 |
| 1,959,151 | 5/1934 | Beekley | 23—212 A |
| 2,129,760 | 9/1938 | Greenawalt | 75—74 X |
| 2,668,107 | 2/1954 | Gordan | 75—74 |
| 2,194,454 | 3/1940 | Greenawalt | 75—74 |
| 2,784,078 | 3/1957 | Greenawalt | 75—74 X |
| 3,669,646 | 6/1972 | Cullom | 75—74 |

FOREIGN PATENTS

| | | | |
|---|---|---|---|
| 1,116,129 | 6/1968 | Great Britain | 23—181 |

L. DEWAYNE RUTLEDGE, Primary Examiner

J. E. LEGRU, Assistant Examiner

U.S. Cl. X.R.

23—227